(12) United States Patent
Tsai

(10) Patent No.: US 8,369,032 B2
(45) Date of Patent: Feb. 5, 2013

(54) COMPACT IMAGING LENS ASSEMBLY

(75) Inventor: Tsung Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 13/400,506

(22) Filed: Feb. 20, 2012

(65) Prior Publication Data

US 2012/0147250 A1 Jun. 14, 2012

Related U.S. Application Data

(62) Division of application No. 12/855,489, filed on Aug. 12, 2010, now Pat. No. 8,213,097.

(51) Int. Cl.
*G02B 9/04* (2006.01)
*G02B 13/18* (2006.01)

(52) U.S. Cl. ........................................ 359/795; 359/717

(58) Field of Classification Search .................. 359/717, 359/795
See application file for complete search history.

(56) References Cited

U.S. PATENT DOCUMENTS

2006/0056068 A1 * 3/2006 Lee et al. ...................... 359/781

* cited by examiner

*Primary Examiner* — William Choi
(74) *Attorney, Agent, or Firm* — Morris, Manning & Martin, LLP; Tim Tingkang Xia, Esq.

(57) ABSTRACT

This invention provides a compact imaging lens assembly from an object side toward an image side in order including a first lens element with positive refractive power having a convex object-side surface and a convex image-side surface with at least one of surfaces thereof being aspheric, a second lens element with negative refractive power having a concave object-side surface and a concave image-side surface with at least one of surfaces thereof being aspheric. An aperture stop is positioned between the imaged object and the second lens element. There are two lens elements with refractive power in the compact imaging lens assembly.

7 Claims, 10 Drawing Sheets

| TABLE 1 | | | | | | |
|---|---|---|---|---|---|---|
| (Embodiment 1) | | | | | | |
| f = 1.65 mm, Fno = 2.80, HFOV = 28.0 deg. | | | | | | |
| Surface # | | Curvature Radius | Thickness | Material | Index | Abbe # | Focal length |
| 0 | Object | Plano | Infinity | | | | |
| 1 | Ape. Stop | Plano | 0.031 | | | | |
| 2 | Lens 1 | 3.51460 (ASP) | 0.748 | Plastic | 1.544 | 55.9 | 0.58 |
| 3 | | -0.32074 (ASP) | 0.105 | | | | |
| 4 | Lens 2 | -0.46237 (ASP) | 0.353 | Plastic | 1.583 | 30.2 | -0.61 |
| 5 | | 1.96953 (ASP) | 0.150 | | | | |
| 6 | IR-filter | Plano | 0.300 | Glass | 1.517 | 64.2 | - |
| 7 | | Plano | 0.050 | | | | |
| 8 | Cover-glass | Plano | 0.400 | Glass | 1.517 | 64.2 | - |
| 9 | | Plano | 0.291 | | | | |
| 10 | Image | Plano | - | | | | |

Fig. 4

| TABLE 2 | | | | |
|---|---|---|---|---|
| Aspheric Coefficients | | | | |
| Surface # | 2 | 3 | 4 | 5 |
| k = | 0.00000E+00 | -3.83712E+00 | -9.08787E+00 | 1.06501E+01 |
| A4 = | -1.37737E+00 | -3.09294E+00 | 1.02312E+00 | 1.57768E+00 |
| A6 = | 9.44967E+00 | 1.59754E+01 | -1.65328E+01 | -2.01897E+01 |
| A8 = | -1.70511E+02 | -8.95346E+01 | 8.96791E+01 | 1.16454E+02 |
| A10= | 5.04318E+02 | 2.42658E+02 | -2.78944E+02 | -3.31706E+02 |
| A12= | -3.70812E+02 | -2.63606E+02 | 4.00335E+02 | 1.01690E+02 |
| A14= | 3.65324E-07 | -3.42245E+01 | 1.75571E+02 | 1.58454E+03 |
| A16= | 7.23896E-07 | 5.12627E+01 | -2.68025E+02 | -2.64991E+03 |

Fig. 5

| TABLE 3 | | | | | | |
|---|---|---|---|---|---|---|
| (Embodiment 2) | | | | | | |
| f = 1.68 mm, Fno = 2.85, HFOV = 27.5 deg. | | | | | | |
| Surface # | | Curvature Radius | Thickness | Material | Index | Abbe # | Focal length |
| 0 | Object | Plano | Infinity | | | | |
| 1 | Ape. Stop | Plano | 0.192 | | | | |
| 2 | Lens 1 | 2.22222 (ASP) | 1.024 | Plastic | 1.544 | 55.9 | 0.86 |
| 3 | | -0.49303 (ASP) | 0.241 | | | | |
| 4 | Lens 2 | -0.76376 (ASP) | 0.250 | Plastic | 1.632 | 23.4 | -0.91 |
| 5 | | 2.63202 (ASP) | 0.150 | | | | |
| 6 | IR-filter | Plano | 0.300 | Glass | 1.517 | 64.2 | - |
| 7 | | Plano | 0.050 | | | | |
| 8 | Cover-glass | Plano | 0.400 | Glass | 1.517 | 64.2 | - |
| 9 | | Plano | 0.101 | | | | |
| 10 | Image | Plano | - | | | | |

Fig. 6

| TABLE 4 | | | | |
|---|---|---|---|---|
| Aspheric Coefficients | | | | |
| Surface # | 2 | 3 | 4 | 5 |
| k = | -1.00000E+00 | -6.36599E+00 | -2.00113E+01 | 1.57288E+01 |
| A4 = | -5.46093E-01 | -3.15689E+00 | 3.23550E-01 | 2.47327E+00 |
| A6 = | 2.16855E+00 | 1.77631E+01 | -1.49898E+01 | -2.62859E+01 |
| A8 = | -4.81861E+01 | -8.32439E+01 | 9.16597E+01 | 1.21689E+02 |
| A10= | 2.16760E+02 | 2.37819E+02 | -2.93493E+02 | -2.55324E+02 |
| A12= | -3.70733E+02 | -3.76023E+02 | 4.01470E+02 | -1.63826E+01 |
| A14= | 2.72666E-01 | 2.56497E+02 | 1.46569E+02 | 9.53404E+02 |
| A16= | 2.45892E-02 | -1.54046E+01 | -5.94892E+02 | -1.12560E+03 |

Fig. 7

| TABLE 5 | | | | | | |
|---|---|---|---|---|---|---|
| (Embodiment 3) | | | | | | |
| f = 1.54 mm, Fno = 2.40, HFOV = 30.0 deg. | | | | | | |
| Surface # | | Curvature Radius | Thickness | Material | Index | Abbe # | Focal length |
| 0 | Object | Plano | Infinity | | | | |
| 1 | Ape. Stop | Plano | 0.088 | | | | |
| 2 | Lens 1 | 2.61158 (ASP) | 0.781 | Plastic | 1.544 | 55.9 | 0.59 |
| 3 | | -0.32669 (ASP) | 0.104 | | | | |
| 4 | Lens 2 | -0.48393 (ASP) | 0.250 | Plastic | 1.583 | 30.2 | -0.65 |
| 5 | | 2.01785 (ASP) | 0.150 | | | | |
| 6 | IR-filter | Plano | 0.300 | Glass | 1.517 | 64.2 | - |
| 7 | | Plano | 0.050 | | | | |
| 8 | Cover-glass | Plano | 0.400 | Glass | 1.517 | 64.2 | - |
| 9 | | Plano | 0.251 | | | | |
| 10 | Image | Plano | - | | | | |

Fig. 8

| TABLE 6 | | | | |
|---|---|---|---|---|
| Aspheric Coefficients | | | | |
| Surface # | 2 | 3 | 4 | 5 |
| k = | -1.00000E+00 | -4.00853E+00 | -8.58831E+00 | 1.08073E+01 |
| A4 = | -9.27877E-01 | -3.24315E+00 | 1.25131E+00 | 1.33945E+00 |
| A6 = | -5.75527E-01 | 1.79100E+01 | -1.98672E+01 | -1.93480E+01 |
| A8 = | -2.44306E+01 | -9.06064E+01 | 1.16814E+02 | 1.16525E+02 |
| A10= | -8.77273E+01 | 2.34486E+02 | -3.48075E+02 | -3.32818E+02 |
| A12= | -3.70812E+02 | -2.65073E+02 | 4.01294E+02 | 1.00855E+02 |
| A14= | 1.20422E-04 | -3.73794E+01 | 1.65480E+02 | 1.58897E+03 |
| A16= | 2.16274E-04 | 6.75502E+01 | -2.75265E+02 | -2.64205E+03 |

Fig. 9

| TABLE 7 | | | |
|---|---|---|---|
| | Embodiment 1 | Embodiment 2 | Embodiment 3 |
| f | 1.65 | 1.68 | 1.54 |
| Fno | 2.80 | 2.85 | 2.40 |
| HFOV | 28.00 | 27.50 | 30.00 |
| V1-V2 | 25.70 | 32.50 | 25.70 |
| CT1/f | 0.45 | 0.61 | 0.51 |
| CT2/f | 0.21 | 0.15 | 0.16 |
| (T12/f)*100 | 6.36 | 14.35 | 6.75 |
| R2/R1 | -0.09 | -0.22 | -0.13 |
| R3/R4 | -0.24 | -0.29 | -0.24 |
| f1/f2 | -0.95 | -0.95 | -0.91 |
| f/f1 | 2.85 | 1.95 | 2.61 |
| f/f2 | -2.71 | -1.85 | -2.37 |
| Bf/TTL | 0.44 | 0.34 | 0.45 |
| SL/TTL | 1.01 | 1.08 | 1.04 |
| TTL/ImgH | 2.46 | 2.59 | 2.33 |

Fig. 10

COMPACT IMAGING LENS ASSEMBLY

CROSS-REFERENCE TO RELATED APPLICATIONS

This non-provisional application is a divisional application of U.S. patent application Ser. No. 12/855,489, filed Aug. 12, 2010, which itself claims priority under 35 U.S.C. §119(a) on Patent Application No(s). 099110861 filed in Taiwan, R.O.C. on Apr. 8, 2010, the entire contents of which are hereby incorporated by reference.

BACKGROUND OF THE INVENTION

1. Field of the Invention

The present invention relates to a compact imaging lens assembly, and more particularly, to a compact imaging lens assembly for compact electronics.

2. Description of the Prior Art

In recent years, with the popularity of camera modules, the demand for compact imaging lenses is increasing, and the sensor of a general photographing camera is none other than CCD (charge coupled device) or CMOS sensor (Complementary Metal Oxide Semiconductor Sensor). Furthermore, the pixel size of sensors is reduced due to the advancing semiconductor manufacturing technology and makes electronic products become more compact and powerful. Therefore, there is an increasing demand for compact imaging lenses with superb image quality.

A conventional compact imaging lens is generally configured as a three-lens element structure for the purpose of aberration correction, which a positive-negative-positive Triplet structure is usually adopted. When the lens continues to reduce in size, imaging space in the system also reduces. Thus, the insertion of three lens elements becomes difficult, and, within a limited space, the thickness of the lens also decreases, which causes unevenness of the plastic lens material from injection molding process.

In order to effectively reduce the total track length of the lens assembly while maintaining high yield in lens manufacturing, two-lens structure proves to be the best solution. For the purpose of correcting aberrations, usually an arrangement of frontal aperture stop is adopted, such as a compact imaging lens assembly comprising two lens elements disclosed in U.S. Pat. No. 7,525,741. However, the first lens element being meniscus in U.S. Pat. No. 7,525,741 provides limited refractive power that makes it difficult for the lens assembly to achieve its compactness.

Therefore, a need exists in the art for a compact imaging lens assembly that requires simple manufacturing process, without total track length of the system being too long and the system sensitivity being too high.

SUMMARY OF THE INVENTION

An aspect of the present invention provides a compact imaging lens assembly comprising, in order from an object side to an image side: a first lens element with positive refractive power having a convex object-side surface and a convex image-side surface, at least one of the object-side and image-side surfaces thereof being aspheric; a second lens element with negative refractive power having a concave object-side surface and a concave image-side surface, at least one of the object-side and image-side surfaces thereof being aspheric; wherein the compact imaging lens assembly further comprises an aperture stop and an electronic sensor for image formation, the aperture stop is disposed between an imaged object and the second lens element, the electronic sensor is disposed at the image plane; wherein there are two lens elements with refractive power in the compact imaging lens assembly, the distance on the optical axis between the first lens element and the second lens element is T12, the focal length of the compact imaging lens assembly is f, the distance on the optical axis between the aperture stop and the electronic sensor is SL, the distance on the optical axis between the object-side surface of the first lens element and the electronic sensor is TTL, the Abbe number of the first lens element is V1, the Abbe number of the second lens element is V2, the radius of curvature on the object-side surface of the first lens element is R1, the radius of curvature on the image-side surface of the first lens element is R2, and they satisfy the relations: $1<(T12/f)*100<25$; $0.5<SL/TTL<1.3$; $15<V1-V2<48$; $-1.0<R2/R1<0.0$.

According to another aspect of the present invention, a compact imaging lens assembly comprises, in order from the object side to the image side: a first lens element with positive refractive power having a convex object-side surface and a convex image-side surface, the object-side and image-side surfaces thereof being aspheric; and a second lens element with negative refractive power having a concave object-side surface and a concave image-side surface, at least one of the object-side and image-side surfaces thereof being aspheric, an air distance between itself and the first lens element; wherein the compact imaging lens assembly further comprises an aperture stop and an electronic sensor for image formation, the aperture is disposed between an imaged object and the first lens element, the electronic sensor is disposed at the image plane; wherein there are two lens elements with refractive power in the compact imaging lens assembly, the distance on the optical axis between the aperture stop and the electronic sensor is SL, the distance on the optical axis between the object-side surface of the first lens element and the electronic sensor is TTL, the radius of curvature on the object-side surface of the second lens element is R3, the radius of curvature on the image-side surface of the second lens element is R4, the thickness on the optical axis of the first lens element is CT1, the focal length of the compact imaging lens assembly is f, and they satisfy the relation: $0.92<SL/TTL<1.20$; $-0.45<R3/R4<0$; $0.35<CT1/f<0.70$.

Such an arrangement of optical elements can effectively reduce the total track length of the lens assembly, lower the system sensitivity, and obtains high image quality.

In the present compact imaging lens assembly, the first lens element has positive refractive power, as the main source of refractive power of the system, which reduces the total track length of the optical system; the second lens element has negative refractive power, which effectively corrects the aberration generated from the positive refractive power of the first lens element and corrects the chromatic aberration of the system at the same time.

In the present compact imaging lens assembly, the first lens element is a bi-convex lens element, which can effectively enhance the refractive power of the first lens element, and the total track length of the optical system can be shortened. The second lens element is a bi-concave lens element with negative refractive power, the negative refractive power of the second lens element can be effectively enhanced in order to correct the chromatic aberration of the system.

In the aforementioned compact imaging lens assembly of the present invention, the aperture stop can be disposed between the imaged object and the first lens element or between the first lens element and the second lens element. Through the first lens element providing positive refractive power and positioning the aperture stop closer to the imaged object in the compact imaging lens assembly, the total track length of the compact imaging lens assembly can be effectively reduced. In addition, the exit pupil of the aforementioned compact imaging lens assembly can be further away from the image plane. Thus, the incident light will be projected onto the sensor with a near perpendicular angle, which is called the telecentric feature. Telecentric feature is very important for the photosensitivity of current solid state electronic sensors. It increases the photosensitivity of the electronic sensor while reducing the occurrence of the shadowing in the system. Furthermore, by having the aperture stop closer to the second lens element, distortion and chromatic aberration of magnification of the optical system can be corrected, while obtaining a good balance between reducing the total track length of the lens assembly and the sensitivity of the system. In other words, in aforementioned compact imaging lens assembly of the present invention, when the aperture stop is closer to the imaged object, the telecentric feature is emphasized and the total optical track length of the imaging lens assembly can be shortened; wherein the aperture stop is closer to the second lens element, the sensitivity of the system can be effectively reduced.

BRIEF DESCRIPTION OF THE DRAWINGS

FIG. 4 is TABLE 1 which lists the optical data of the first embodiment.

FIG. 5 is TABLE 2 which lists the aspheric surface data of the first embodiment.

FIG. 6 is TABLE 3 which lists the optical data of the second embodiment.

FIG. 7 is TABLE 4 which lists the aspheric surface data of the second embodiment.

FIG. 8 is TABLE 5 which lists the optical data of the third embodiment.

FIG. 9 is TABLE 6 which lists the aspheric surface data of the third embodiment.

FIG. 10 is TABLE 7 which lists the data of the respective embodiments resulting from the equations.

DETAILED DESCRIPTION OF THE PREFERRED EMBODIMENTS

Figure 1A:
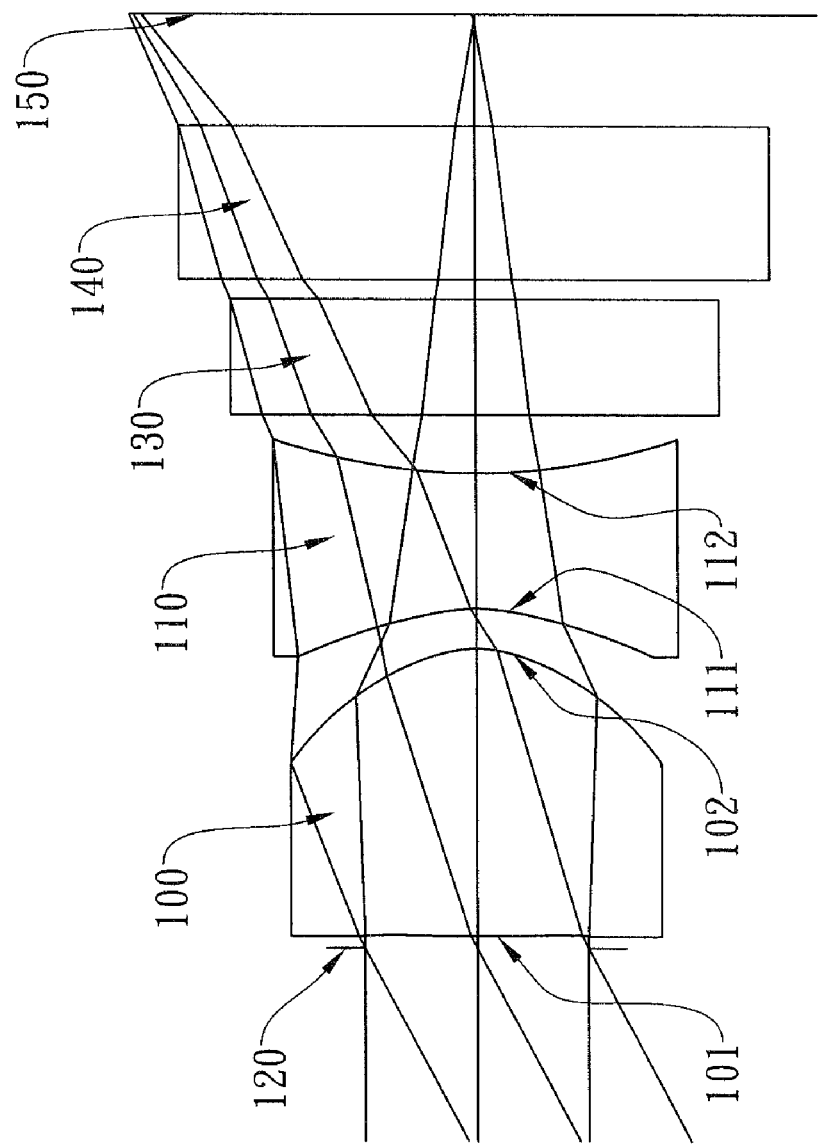
FIG. 1A shows a compact imaging lens assembly in accordance with a first embodiment of the present invention.

An aspect of the present invention provides a compact imaging lens assembly comprising, in order from an object side to an image side: a first lens element with positive refractive power having a convex object-side surface and a convex image-side surface, at least one of the object-side and image-side surfaces thereof being aspheric; a second lens element with negative refractive power having a concave object-side surface and a concave image-side surface, at least one of the object-side and image-side surfaces thereof being aspheric; wherein the compact imaging lens assembly further comprises an aperture stop and an electronic sensor for image formation, the aperture stop is disposed between the imaged object and the second lens element, the electronic sensor is disposed at the image plane; wherein there are two lens elements with refractive power in the compact imaging lens assembly, the distance on the optical axis between the first and second lens elements is T12, the focal length of the compact imaging lens assembly is f, the distance on the optical axis between the aperture stop and the electronic sensor is SL, the distance on the optical axis between the object-side surface of the first lens element and the electronic sensor is TTL, the Abbe number of the first lens element is V1, the Abbe number of the second lens element is V2, the radius of curvature on the object-side surface of the first lens element is R1, the radius of curvature on the image-side surface of the first lens element is R2, the distance on the optical axis between the image-side surface of the second, and they satisfy the relations: $1<(T12/f)*100<25$; $0.5<SL/TTL<1.3$; $15<V1-V2<48$; $-1.0<R2/R1<0.0$.

When the aforementioned compact imaging lens assembly satisfies the relation: $1<(T12/f)*100<25$, the high order aberration of the imaging lens can be favorably corrected with better image quality of the optical system, and such arrangement of the lens assembly makes the system more compact by reducing the total optical track length of the system. When the aforementioned compact imaging lens assembly satisfies the relation: $0.5<SL/TTL<1.3$, a good balance between reducing the size of the lens assembly and lowering the sensitivity of the system can be obtained; furthermore, they preferably satisfy the relation: $0.92<SL/TTL<1.20$. When the aforementioned compact imaging lens assembly satisfies the relation: $15<V1-V2<48$, the chromatic aberration in the compact imaging lens assembly can be favorably corrected; furthermore, they preferably satisfy the relation: $25<V1-V2<38$. When the aforementioned compact imaging lens assembly satisfies the relation: $-1.0<R2/R1<0.0$, the spherical aberration of the system can be favorably corrected; furthermore, they preferably satisfy the relation: $-0.3<R2/R1<0.0$.

In the aforementioned compact imaging lens assembly of the present invention, preferably, the first lens element made of plastic has the object-side and the image-side surfaces being aspheric, and the second lens element made of plastic also has the both surfaces being aspheric. Aspheric surfaces can be easily made into non-spherical profiles, allowing more design parameter freedom which can be used to reduce aberrations and the number of the lens elements. Accordingly, the total track length of the compact imaging lens assembly can be effectively reduced. By using plastic materials, it becomes favorable for the making of aspheric lenses and the manufacturing cost can be effectively reduced.

In the aforementioned compact imaging lens assembly of the present invention, the distance on the optical axis between the image-side surface of the second lens element and the electronic sensor is Bf, the distance on the optical axis between the object-side surface of the first lens element and the electronic sensor is TTL, and preferably, they satisfy the relation: $0.25<Bf/TTL<0.50$. When Bf/TTL satisfies the relation, there is enough back focal distance in the lens assembly to allocate other components while preventing the total track length of the lens system from becoming too long.

In the aforementioned compact imaging lens assembly of the present invention, the focal length of the first lens element is f1, the focal length of the second lens element is f2, and preferably, they satisfy the relation: $-1.10<f1/f2<-0.80$. When f1/f2 satisfies the relation, the arrangement of refractive power from the first and the second lens elements is more balanced, which is beneficial for correcting aberration and lowering the sensitivity of the system.

In the aforementioned compact imaging lens assembly of the present invention, the focal length of the compact imaging lens assembly is f, the focal length of the first lens element is f1, and preferably, they satisfy the relation: $1.7<f/f1<3.0$. When f/f1 satisfies the relation, the refractive power of the first lens element is more balanced, which can effectively maintain the total track length of the optical system and the compact feature of the system, prevent the high order spherical aberration from becoming too large, in order to improve image quality; moreover, it satisfies the relation: $2.3<f/f1<2.8$.

In the aforementioned compact imaging lens assembly of the present invention, the radius of curvature on the object-side surface of the second lens element is R3, the radius of curvature on the image-side surface of the second lens element is R4, and preferably, they satisfy the relation: $-0.45<R3/R4<0$. When R3/R4 satisfies the relation, the high order aberration of the system can be favorably corrected.

In the aforementioned compact imaging lens assembly of the present invention, the focal length of the compact imaging lens assembly is f, the focal length of the second lens element is f2, and preferably, they satisfy the relation: $-3.0<f/f2<-1.5$. When f/f2 satisfies the relation, the aberration generated by the positive refractive power of the first lens element can be effectively corrected and it also prevents the refractive power of the second lens element from becoming too large while avoiding too much high order aberration.

In the aforementioned compact imaging lens assembly of the present invention, the thickness on the optical axis of the second lens element is CT2, the focal length of the compact imaging lens assembly is f, and preferably, they satisfy the relation: $0.12<CT2/f<0.25$. When CT/f satisfies the relation, it can provide better moldability and homogeneity of the plastic-injection-molded lenses to ensure the good image quality of the compact imaging lens assembly.

In the aforementioned compact imaging lens assembly of the present invention, the distance on the optical axis between the object-side of the first lens element and the electronic sensor is TTL, half of the diagonal length of the effective pixel area on the electronic sensor is ImgH, and preferably, they satisfy the relation: $TTL/ImgH<3.0$. When TTL/ImgH satisfies the relation, the compact imaging lens assembly can be favorably maintained in compact size for applications of light weight mobile electronic products.

According to another aspect of the present invention, a compact imaging lens assembly comprises, in order from the object side to the image side: a first lens element with positive refractive power having a convex object-side surface and a convex image-side surface, both surfaces being aspheric; a second lens element with negative refractive power having a concave object-side surface and a concave image-side surface, at least one of the object-side and image-side surfaces thereof being aspheric, an air distance between the first and second lens elements; wherein the compact imaging lens assembly further comprises an aperture stop and an electronic sensor for image formation, the aperture stop is disposed between the imaged object and the first lens element, the electronic sensor is disposed at the image plane, and there are two lens elements with refractive power in the compact imaging lens assembly; wherein the distance on the optical axis between the aperture stop and the electronic sensor is SL, the distance on the optical axis between the object-side surface of the first lens element and the electronic sensor is TTL, the radius of curvature on the object-side surface of the second lens element is R3, the radius of curvature on the image-side surface of the second lens element is R4, the thickness on the optical axis of the first lens element is CT1, the focal length of the compact imaging lens assembly is f, and they satisfy the relation: $0.92<SL/TTL<1.20$; $-0.45<R3/R4<0$; $0.35<CT1/f<0.70$.

When the aforementioned compact imaging lens assembly satisfies the relation: $0.92<SL/TTL<1.20$, a good balance between reducing the size of the lens assembly and lowering the sensitivity of the system can be obtained. When the aforementioned compact imaging lens assembly satisfies the relation: $-0.45<R3/R4<0$, the high order aberration of the system can be favorably corrected.

When the aforementioned compact imaging lens assembly satisfies the relation: $0.35<CT1/f<0.70$, it can provide better moldability and homogeneity of the plastic-injection-molded lenses to ensure the good image quality of the compact imaging lens assembly.

In the aforementioned compact imaging lens assembly of the present invention, the focal length of the compact imaging lens assembly is f, the focal length of the first lens element is f1, and preferably, they satisfy the relation: $1.7<f/f1<3.0$. When f/f1 satisfies the relation, the distribution of the refractive power of the first lens element is more balanced, which can effectively control the total track length of the system to stay compact while preventing the high order spherical aberration from becoming too large, in order to improve image quality.

In the aforementioned compact imaging lens assembly of the present invention, the distance on the optical axis between the first and second lens elements is T12, the focal length of the compact imaging lens assembly is f, and preferably, they satisfy the relation: $3<(T12/f)*100<18$. When T12/f satisfies the relation, the high order aberration of the imaging lens can be favorably corrected with better image quality of the optical system, and such arrangement of the lens assembly makes the system more compact by reducing the total optical track length of the system.

In the aforementioned compact imaging lens assembly of the present invention, the Abbe number of the first lens element is V1, the Abbe number of the second lens element is V2, and preferably, they satisfy the relation: $25<V1-V2<38$. When V1-V2 satisfies the relation, the chromatic aberration in the compact imaging lens assembly can be favorably corrected In the aforementioned compact imaging lens assembly of the present invention, the focal length of the first lens element is f1, the focal length of the second lens element is f2, and preferably, they satisfy the relation: $-1.10<f1/f2<-0.80$. When f1/f2 satisfies the relation, the arrangement of refractive power is more balanced between the first and second lens elements, which can correct the aberration and lower the sensitivity.

In the aforementioned compact imaging lens assembly of the present invention, the distance on the optical axis between the image-side surface of the second lens element and the electronic sensor is Bf, the distance on the optical axis between the object-side surface of the first lens element and the electronic sensor is TTL, and preferably, they satisfy the relation: $0.25<Bf/TTL<0.50$. When Bf/TTL satisfies the relation, there is enough back focal distance in the lens assembly to allocate other components while preventing the total track length of the lens system from becoming too long.

In the aforementioned compact imaging lens assembly of the present invention, the radius of curvature on the object-side surface of the first lens element is R1, the radius of curvature on the image-side surface of the first lens element is R2, and preferably, they satisfy the relation: $-0.3<R2/R1<0.0$. When R2/R1 satisfies the relation, the spherical aberration of the system can be favorably corrected.

In the present compact imaging lens assembly, the lens elements can be made of glass or plastic. If the lens elements are made of glass, there is more freedom in distributing the refractive power of the system. If plastic is adopted to produce lens elements, the manufacturing cost will be reduced effectively. Moreover, surfaces of the lens elements can be made aspheric. Aspheric surfaces can be easily made into non-spherical profiles, allowing more design parameter freedom which can be used to reduce aberrations and the number of the lens elements. Accordingly, the total track length of the compact imaging lens assembly can be effectively reduced.

In the present compact imaging lens assembly, if a lens element has a convex surface, it means the portion of the surface in proximity to the axis is convex; if a lens element has a concave surface, it means the portion of the surface in proximity to the axis is concave.

Preferred embodiments of the present invention will be described in the following paragraphs by referring to the accompanying drawings.

Figure 1B:
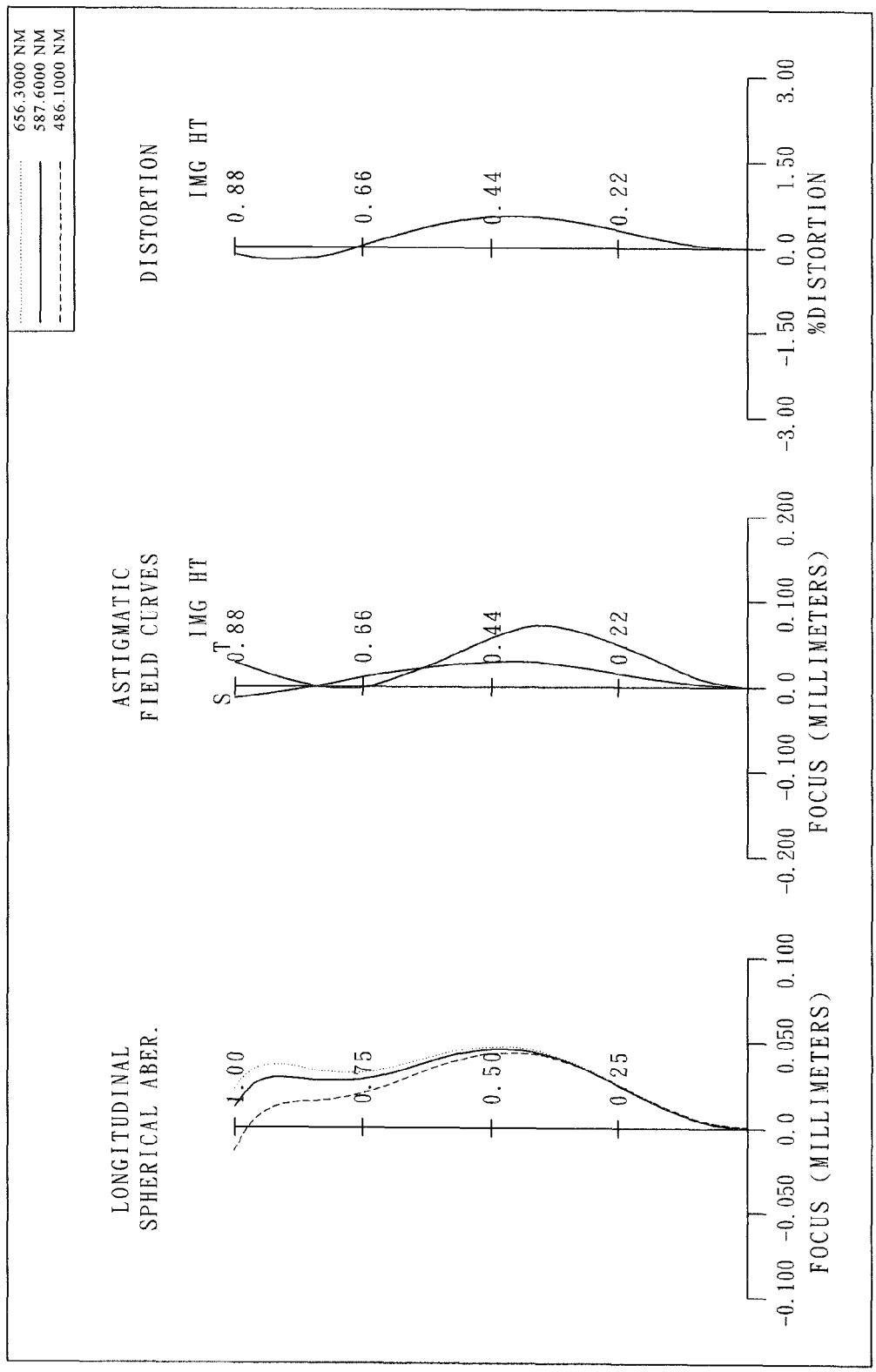
FIG. 1B shows the aberration curves of the first embodiment of the present invention.

FIG. 1A shows a compact imaging lens assembly in accordance with a first embodiment of the present invention, and FIG. 1B shows the aberration curves of the first embodiment of the present invention. The compact imaging lens assembly of the first embodiment of the present invention mainly comprises two lens elements, in order from an object side to an image side: a plastic first lens element 100 with positive refractive power having a convex object-side surface 101 and a convex image-side surface 102, the object-side and image-side surfaces 101 and 102 thereof being aspheric; and a plastic second lens element 110 with negative refractive power having a concave object-side surface 111 and a concave image-side surface 112, the object-side and image-side surfaces 111 and 112 thereof being aspheric; wherein an aperture stop 120 is disposed between the imaged object and the first lens element 100; wherein an IR filter 130 is disposed between the image-side surface 112 of the second lens element 110 and the image plane 150 and a cover-glass 140 is disposed between the IR filter 130 and the image plane 150; and wherein the IR filter 130 and the cover-glass 140 are made of glass and have no influence on the focal length of the compact imaging lens assembly.

The equation of the aspheric surface profiles is expressed as follows:

$$X(Y) = (Y^2/R)/(1 + \text{sqrt}(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present compact imaging lens assembly, the focal length of the compact imaging lens assembly is f, and it satisfies the relation: f=1.65 (mm).

In the first embodiment of the present compact imaging lens assembly, the f-number of the compact imaging lens assembly is Fno, and it satisfies the relation: Fno=2.80.

In the first embodiment of the present compact imaging lens assembly, half of the maximal field of view of the compact imaging lens assembly is HFOV, and it satisfies the relation: HFOV=28.00 deg.

In the first embodiment of the present compact imaging lens assembly, the distance on the optical axis between the first lens element 100 and the second lens element 110 is T12, the focal length of the compact imaging lens assembly is f, and they satisfy the relation: (T12/f)*100=6.36.

In the first embodiment of the present compact imaging lens assembly, the electronic sensor is disposed at image plane 150 for image formation, the distance on the optical axis between the aperture stop 120 and the image plane 150 is SL, the distance on the optical axis between the object-side surface 101 of the first lens element 100 and the electronic sensor is TTL, and they satisfy the relation: SL/TTL=1.01.

In the first embodiment of the present compact imaging lens assembly, the Abbe number of the first lens element 100 is V1, the Abbe number of the second lens element 110 is V2, and they satisfy the relation: V1−V2=25.70.

In the first embodiment of the present compact imaging lens assembly, the radius of curvature of the object-side surface 101 of the first lens element 100 is R1, the radius of curvature of the image-side surface 102 of the first lens element 100 is R2, and they satisfy the relation: R2/R1=−0.09.

In the first embodiment of the present compact imaging lens assembly, the distance on the optical axis between the image-side surface 112 of the second lens element 110 and the image plane 150 is Bf, the distance on the optical axis between the object-side 101 of the first lens element 100 and the electronic sensor is TTL, and they satisfy the relation: Bf/TTL=0.44.

In the first embodiment of the present compact imaging lens assembly, the focal length of the first lens element 100 is f1, the focal length of the second lens element 110 is f2, and they satisfy the relation: f1/f2=−0.95.

In the first embodiment of the present compact imaging lens assembly, the focal length of the compact imaging lens assembly is f, the focal length of the first lens element 100 is f1, and they satisfy the relation: f/f1=2.85.

In the first embodiment of the present compact imaging lens assembly, the radius of curvature of the object-side surface 111 of the second lens element 110 is R3, the radius of curvature of the image-side surface 112 of the first lens element 110 is R4, and they satisfy the relation: R3/R4=−0.24.

In the first embodiment of the present compact imaging lens assembly, the focal length of the compact imaging lens assembly is f, the focal length of the second lens element 110 is f2, and they satisfy the relation: f/f2=−2.71.

In the first embodiment of the present compact imaging lens assembly, the thickness on the optical axis of the second lens element 110 is CT2, the focal length of the compact imaging lens assembly is f, and they satisfy the relation:

In the first embodiment of the present compact imaging lens assembly, the thickness on the optical axis of the first lens element 100 is CT1, the focal length of the compact imaging lens assembly is f, and they satisfy the relation: CT1/f=0.45.

In the first embodiment of the present compact imaging lens assembly, the distance on the optical axis between the object-side surface 101 of the first lens element 100 and the electronic sensor is TTL, half of the diagonal length of the effective pixel area of the electronic sensor is ImgH, and they satisfy the relation: TTL/ImgH=2.46.

The detailed optical data of the first embodiment is shown in FIG. 4 (TABLE 1), and the aspheric surface data is shown in FIG. 5 (TABLE 2), wherein the units of the radius of curvature, the thickness and the focal length are expressed in mm, and HFOV is half of the maximal field of view.

Figure 2A:
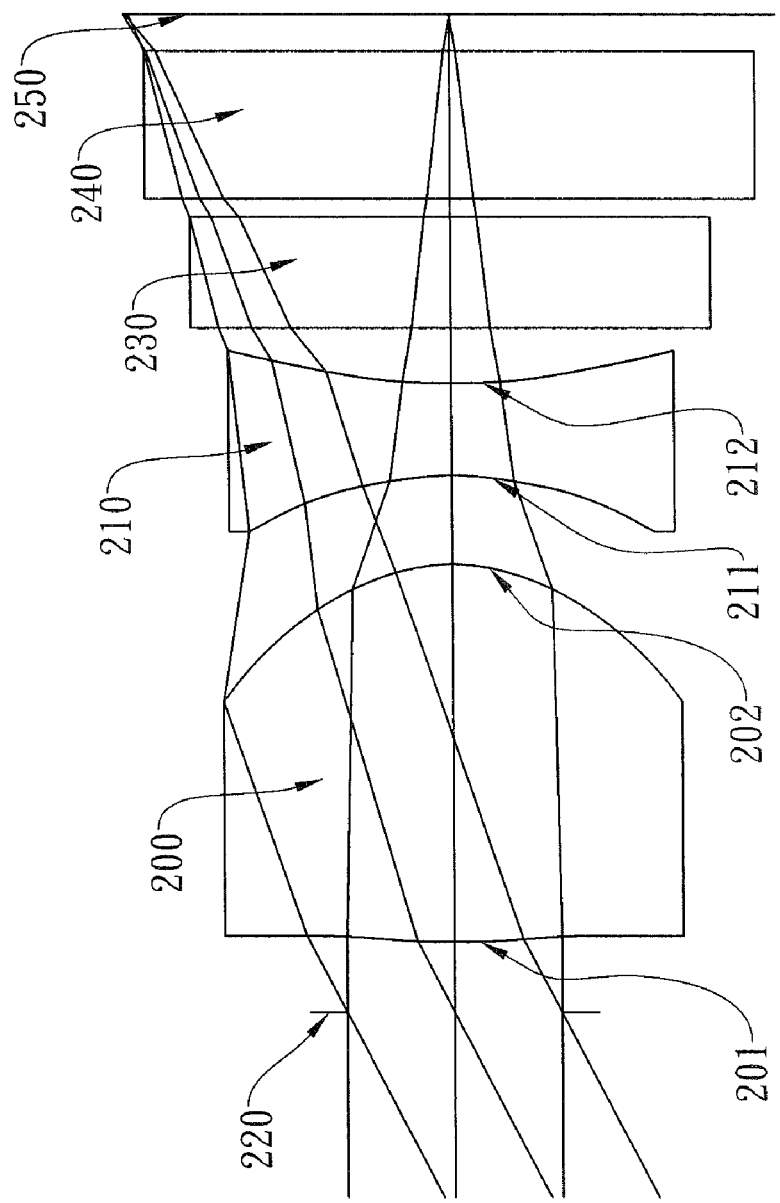
FIG. 2A shows a compact imaging lens assembly in accordance with a second embodiment of the present invention.
Figure 2B:
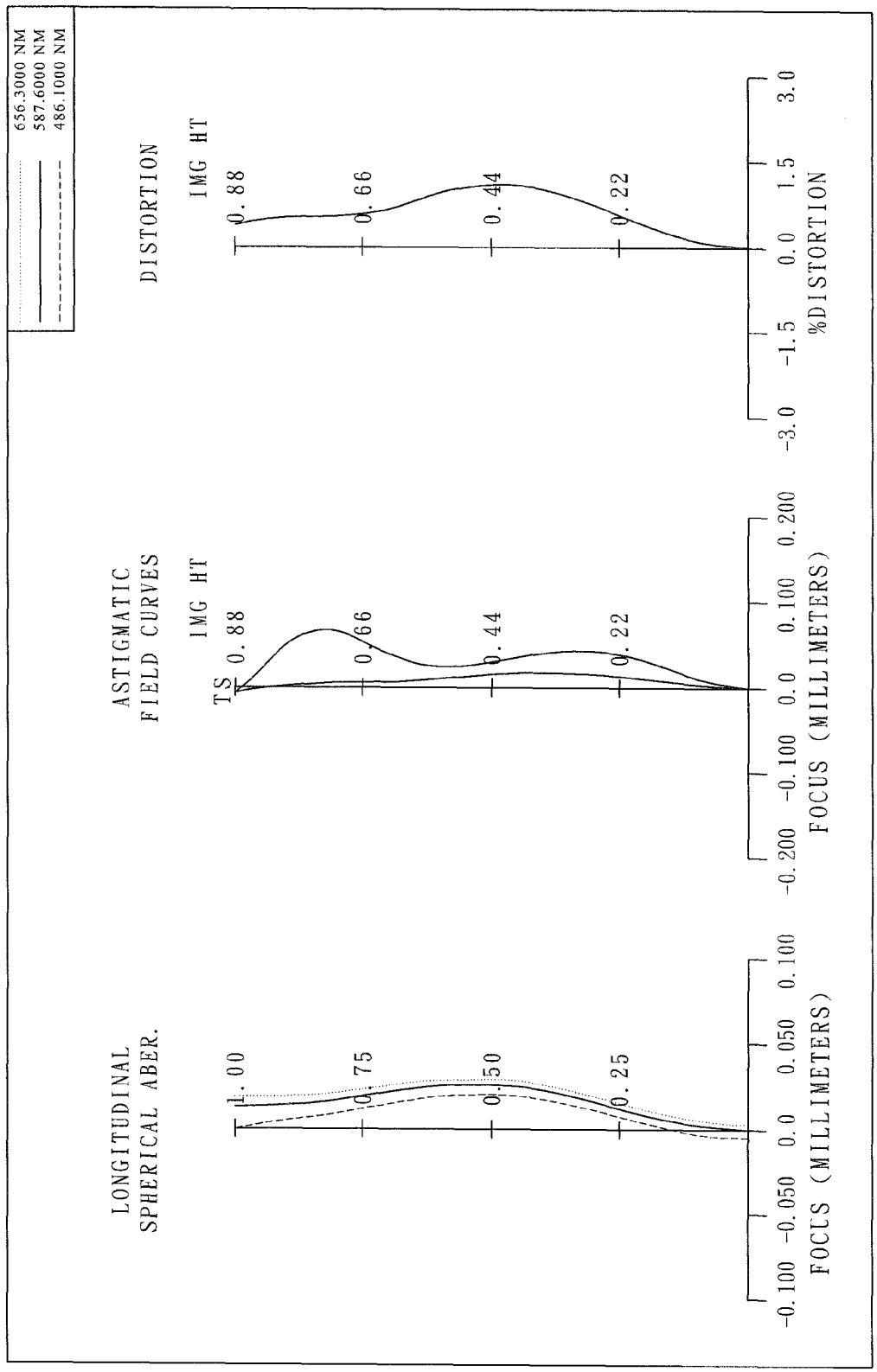
FIG. 2B shows the aberration curves of the second embodiment of the present invention.

FIG. 2A shows a compact imaging lens assembly in accordance with a second embodiment of the present invention, and FIG. 2B shows the aberration curves of the second embodiment of the present invention. The compact imaging lens assembly of the second embodiment of the present invention mainly comprises two lens elements, in order from the object side to the image side: a plastic first lens element 200 with positive refractive power having a convex object-side surface 201 and a convex image-side surface 202, the object-side and image-side surfaces 201 and 202 thereof being aspheric; and a plastic second lens element 210 with negative refractive power having a concave object-side surface 211 and a concave image-side surface 212, the object-side and image-side surfaces 211 and 212 thereof being aspheric; wherein an aperture stop 220 is disposed between the imaged object and the first lens element 200; wherein an IR filter 230 is disposed between the image-side surface 212 of the second lens element 210 and the image plane 250 and a cover-glass 240 is disposed between the IR filter 230 and the image plane 250; and wherein the IR filter 230 and the cover-glass 240 are made of glass and have no influence on the focal length of the compact imaging lens assembly.

The equation of the aspheric surface profiles of the second embodiment has the same form as that of the first embodiment.

In the second embodiment of the present compact imaging lens assembly, the focal length of the compact imaging lens assembly is f, and it satisfies the relation: f=1.68 (mm).

In the second embodiment of the present compact imaging lens assembly, the f-number of the compact imaging lens assembly is Fno, and it satisfies the relation: Fno=2.85.

In the second embodiment of the present compact imaging lens assembly, half of the maximal field of view of the compact imaging lens assembly is HFOV, and it satisfies the relation: HFOV=27.50 deg.

In the second embodiment of the present compact imaging lens assembly, the distance on the optical axis between the first lens element 200 and the second lens element 210 is T12, the focal length of the compact imaging lens assembly is f, and they satisfy the relation: (T12/f)*100=14.35.

In the second embodiment of the present compact imaging lens assembly, the electronic sensor is disposed at image plane 250 for image formation, the distance on the optical axis between the aperture stop 220 and the image plane 250 is SL, the distance on the optical axis between the object-side surface 201 of the first lens element 200 and the electronic sensor is TTL, and they satisfy the relation: SL/TTL=1.08.

In the second embodiment of the present compact imaging lens assembly, the Abbe number of the first lens element 200 is V1, the Abbe number of the second lens element 210 is V2, and they satisfy the relation: V1−V2=32.50.

In the second embodiment of the present compact imaging lens assembly, the radius of curvature of the object-side surface 201 of the first lens element 200 is R1, the radius of curvature of the image-side surface 202 of the first lens element 200 is R2, and they satisfy the relation: R2/R1=−0.22.

In the second embodiment of the present compact imaging lens assembly, the distance on the optical axis between the image-side surface 212 of the second lens element 210 and the image plane 250 is Bf, the distance on the optical axis between the object-side 201 of the first lens element 200 and the electronic sensor is TTL, and they satisfy the relation: Bf/TTL=0.34. In the second embodiment of the present compact imaging lens assembly, the focal length of the first lens element 200 is f1, the focal length of the second lens element 210 is f2, and they satisfy the relation: f1/f2=−0.95.

In the second embodiment of the present compact imaging lens assembly, the focal length of the compact imaging lens assembly is f, the focal length of the first lens element 200 is f1, and they satisfy the relation: f/f1=1.95.

In the second embodiment of the present compact imaging lens assembly, the radius of curvature of the object-side surface 211 of the second lens element 210 is R3, the radius of curvature of the image-side surface 212 of the first lens element 210 is R4, and they satisfy the relation: R3/R4=−0.29.

In the second embodiment of the present compact imaging lens assembly, the focal length of the compact imaging lens assembly is f, the focal length of the second lens element 210 is f2, and they satisfy the relation: f/f2=−1.85.

In the second embodiment of the present compact imaging lens assembly, the thickness on the optical axis of the second lens element 210 is CT2, the focal length of the compact imaging lens assembly is f, and they satisfy the relation: CT2/f=0.15.

In the second embodiment of the present compact imaging lens assembly, the thickness on the optical axis of the first lens element 200 is CT1, the focal length of the compact imaging lens assembly is f, and they satisfy the relation: CT1/f=0.61.

In the second embodiment of the present compact imaging lens assembly, the distance on the optical axis between the object-side surface 201 of the first lens element 200 and the electronic sensor is TTL, half of the diagonal length of the effective pixel area of the electronic sensor is ImgH, and they satisfy the relation: TTL/ImgH=2.59.

The detailed optical data of the second embodiment is shown in FIG. 6 (TABLE 3), and the aspheric surface data is shown in FIG. 7 (TABLE 4), wherein the units of the radius of curvature, the thickness and the focal length are expressed in mm, and HFOV is half of the maximal field of view.

Figure 3A:
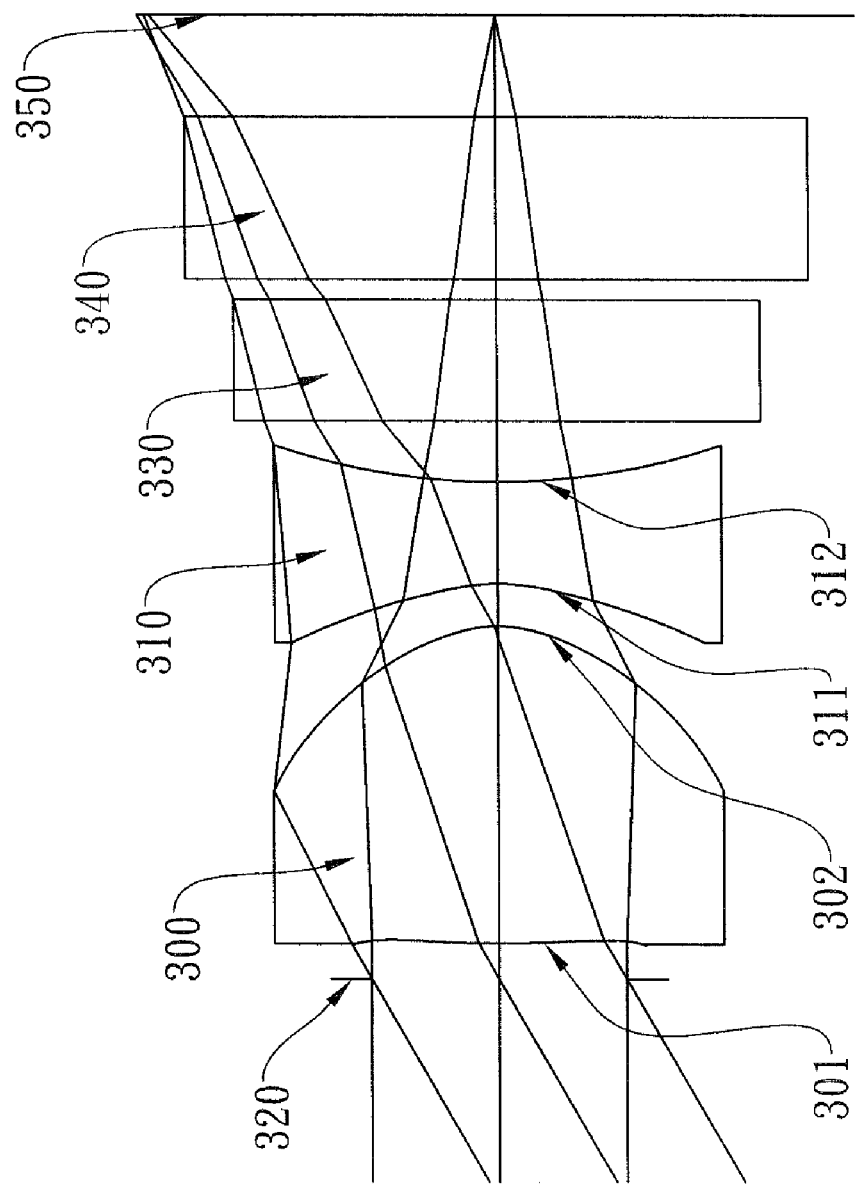
FIG. 3A shows a compact imaging lens assembly in accordance with a third embodiment of the present invention.
Figure 3B:
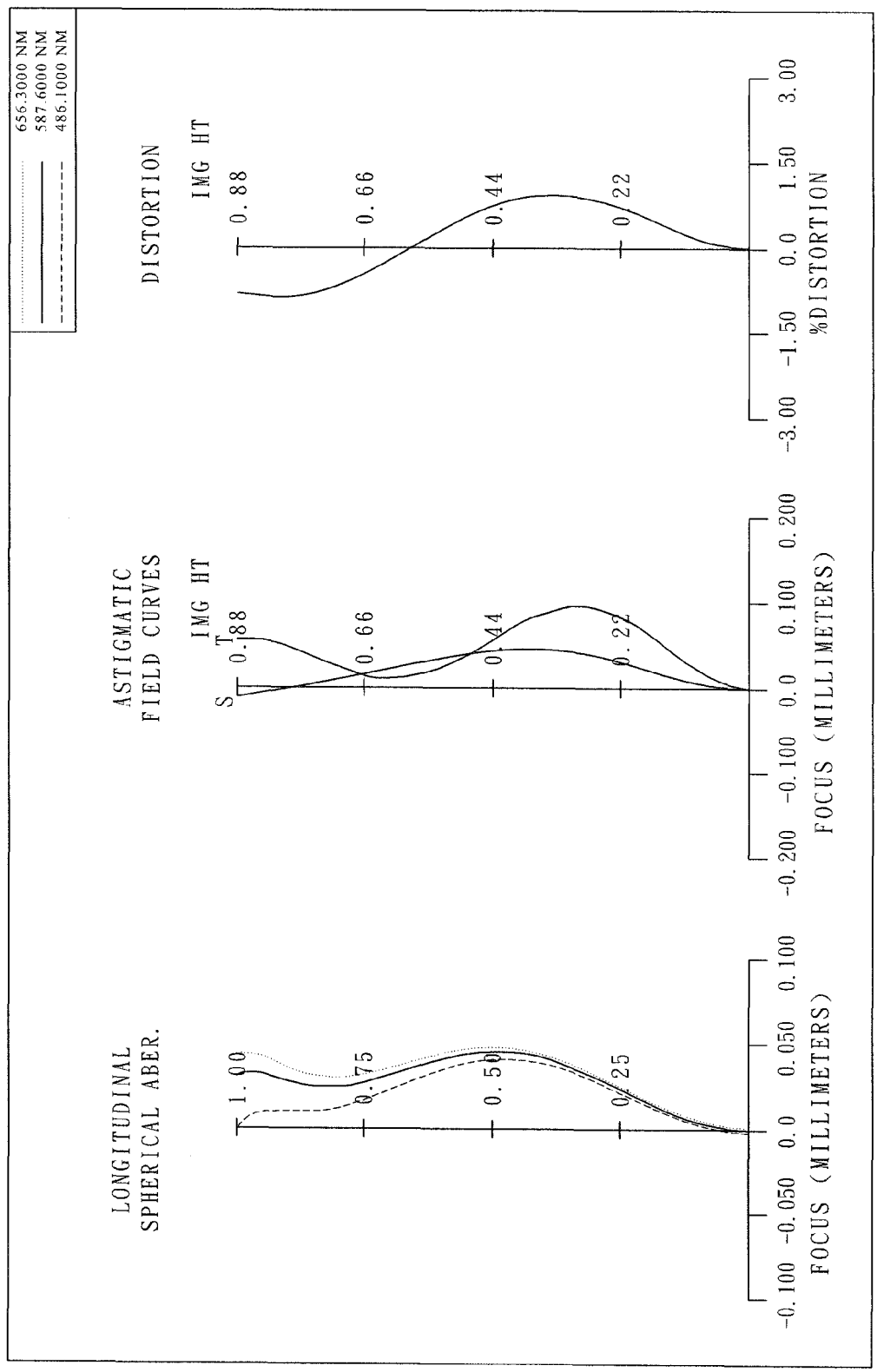
FIG. 3B shows the aberration curves of the third embodiment of the present invention.

FIG. 3A shows a compact imaging lens assembly in accordance with a third embodiment of the present invention, and FIG. 3B shows the aberration curves of the third embodiment of the present invention. The compact imaging lens assembly of the third embodiment of the present invention mainly comprises two lens elements, in order from the object side to the image side: a plastic first lens element 300 with positive refractive power having a convex object-side surface 301 and a convex image-side surface 302, the object-side and image-side surfaces 301 and 302 thereof being aspheric; and a plastic second lens element 310 with negative refractive power having a concave object-side surface 311 and a concave image-side surface 312, the object-side and image-side surfaces 311 and 312 thereof being aspheric; wherein an aperture stop 320 is disposed between the imaged object and the first lens element 300; wherein an IR filter 330 is disposed between the image-side surface 312 of the second lens element 310 and the image plane 350 and a cover-glass 340 is disposed between the IR filter 330 and the image plane 350; and wherein the IR filter 330 and the cover-glass are made of glass and have no influence on the focal length of the compact imaging lens assembly.

The equation of the aspheric surface profiles of the third embodiment has the same form as that of the first embodiment.

In the third embodiment of the present compact imaging lens assembly, the focal length of the compact imaging lens assembly is f, and it satisfies the relation: f=1.54 (mm).

In the third embodiment of the present compact imaging lens assembly, the f-number of the compact imaging lens assembly is Fno, and it satisfies the relation: Fno=2.40.

In the third embodiment of the present compact imaging lens assembly, half of the maximal field of view of the compact imaging lens assembly is HFOV, and it satisfies the relation: HFOV=30.00 deg.

In the third embodiment of the present compact imaging lens assembly, the distance on the optical axis between the first lens element 300 and the second lens element 310 is T12, the focal length of the compact imaging lens assembly is f, and they satisfy the relation: (T12/f)*100=6.75.

In the third embodiment of the present compact imaging lens assembly, the electronic sensor is disposed at image plane 350 for image formation, the distance on the optical axis between the aperture stop 320 and the image plane 350 is SL, the distance on the optical axis between the object-side surface 301 of the first lens element 300 and the electronic sensor is TTL, and they satisfy the relation: SL/TTL=1.04.

In the third embodiment of the present compact imaging lens assembly, the Abbe number of the first lens element 300 is V1, the Abbe number of the second lens element 310 is V2, and they satisfy the relation: V1−V2=25.70.

In the third embodiment of the present compact imaging lens assembly, the radius of curvature of the object-side surface 301 of the first lens element 300 is R1, the radius of curvature of the image-side surface 302 of the first lens element 300 is R2, and they satisfy the relation: R2/R1=−0.13.

In the third embodiment of the present compact imaging lens assembly, the distance on the optical axis between the image-side surface 312 of the second lens element 310 and the image plane 350 is Bf, the distance on the optical axis between the object-side 301 of the first lens element 300 and the electronic sensor is TTL, and they satisfy the relation: Bf/TTL=0.45.

In the third embodiment of the present compact imaging lens assembly, the focal length of the first lens element 300 is f1, the focal length of the second lens element 310 is f2, and they satisfy the relation: f1/f2=−0.91.

In the third embodiment of the present compact imaging lens assembly, the focal length of the compact imaging lens assembly is f, the focal length of the first lens element 300 is f1, and they satisfy the relation: f/f1=2.61.

In the third embodiment of the present compact imaging lens assembly, the radius of curvature of the object-side surface 311 of the second lens element 310 is R3, the radius of curvature of the image-side surface 312 of the first lens element 310 is R4, and they satisfy the relation: R3/R4=−0.24.

In the third embodiment of the present compact imaging lens assembly, the focal length of the compact imaging lens assembly is f, the focal length of the second lens element 310 is f2, and they satisfy the relation: f/f2=−2.37.

In the third embodiment of the present compact imaging lens assembly, the thickness on the optical axis of the second lens element 310 is CT2, the focal length of the compact imaging lens assembly is f, and they satisfy the relation: CT2/f=0.16.

In the third embodiment of the present compact imaging lens assembly, the thickness on the optical axis of the first lens element 300 is CT1, the focal length of the compact imaging lens assembly is f, and they satisfy the relation: CT1/f=0.51.

In the third embodiment of the present compact imaging lens assembly, the distance on the optical axis between the object-side surface 301 of the first lens element 300 and the electronic sensor is TTL, half of the diagonal length of the effective pixel area of the electronic sensor is ImgH, and they satisfy the relation: TTL/ImgH=2.33.

The detailed optical data of the third embodiment is shown in FIG. 8 (TABLE 5), and the aspheric surface data is shown in FIG. 9 (TABLE 6), wherein the units of the radius of curvature, the thickness and the focal length are expressed in mm, and HFOV is half of the maximal field of view.

It is to be noted that TABLES 1-6 (illustrated in FIGS. 4-9 respectively) show different data of the different embodiments, however, the data of the different embodiments are obtained from experiments. Therefore, any compact imaging lens assembly of the same structure is considered to be within the scope of the present invention even if it uses different data. The embodiments depicted above and the appended drawings are exemplary and are not intended to limit the claim scope of the present invention. TABLE 7 (illustrated in FIG. 10) shows the data of the respective embodiments resulting from the equations.

What is claimed is:

1. A compact imaging lens assembly comprising, in order from an object side to an image side:
    a first lens element with positive refractive power having a convex object-side surface and a convex image-side surface, the object-side and image-side surfaces thereof being aspheric; and
    a second lens element with negative refractive power having a concave object-side surface and a concave image-side surface, at least one of the object-side and image-side surfaces thereof being aspheric, an air distance between itself and the first lens element; and
    wherein the compact imaging lens assembly further comprises an aperture stop and an electronic sensor for image formation; wherein the aperture stop is disposed between an imaged object and the first lens element, the electronic sensor is disposed at the image plane; wherein there are two lens elements with refractive power in the compact imaging lens assembly, a distance on the optical axis between the aperture stop and the electronic sensor is SL, a distance on the optical axis between the object-side surface of the first lens element and the electronic sensor is TTL, a radius of curvature on the object-side surface of the second lens element is R3, a radius of curvature on the image-side surface of the second lens element is R4, a thickness on the optical axis of the first lens element is CT1, a focal length of the compact imaging lens assembly is f, and they satisfy the relations:

$0.92<SL/TTL<1.20;$ $-0.45<R3/R4<0;$ $0.35<CT1/f<0.70.$

2. The compact imaging lens assembly according to claim 1, wherein the focal length of the compact imaging lens assembly is f, a focal length of the first lens element is f1, and they satisfy the relation:

$1.7<f/f1<3.0.$

3. The compact imaging lens assembly according to claim 2, wherein a distance on the optical axis between the first lens element and the second lens element is T12, the focal length of the compact imaging lens assembly is f, and they satisfy the relation:

$3<(T12/f)*100<18.$

4. The compact imaging lens assembly according to claim 3, wherein a distance on the optical axis between the image-side surface of the second lens element and the electronic sensor is Bf, the distance on the optical axis between the object-side surface of the first lens element and the electronic sensor is TTL, and they satisfy the relation:

$0.25<Bf/TTL<0.50.$

5. The compact imaging lens assembly according to claim 1, wherein an Abbe number of the first lens element is V1, an Abbe number of the second lens element is V2, and they satisfy the relation:

$25<V1-V2<38.$

6. The compact imaging lens assembly according to claim 5, wherein the focal length of the first lens element is f1, a focal length of the second lens element is f2, and they satisfy the relation:

$-1.10 < f1/f2 < -0.80$.

7. The compact imaging lens assembly according to claim 1, wherein a radius of curvature on the object-side surface of the first lens element is R1, a radius of curvature on the image-side surface of the first lens element is R2, and they satisfy the relation:

$-0.3 < R2/R1 < 0.0$.

* * * * *